US008892819B2

(12) United States Patent
Kurihara et al.

(10) Patent No.: US 8,892,819 B2
(45) Date of Patent: Nov. 18, 2014

(54) MULTI-CORE SYSTEM AND EXTERNAL INPUT/OUTPUT BUS CONTROL METHOD

(71) Applicant: Fujitsu Limited, Kawasaki (JP)

(72) Inventors: Koji Kurihara, Kawasaki (JP); Koichiro Yamashita, Hachioji (JP); Hiromasa Yamauchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 162 days.

(21) Appl. No.: 13/718,292

(22) Filed: Dec. 18, 2012

(65) Prior Publication Data
US 2013/0111143 A1   May 2, 2013

Related U.S. Application Data

(63) Continuation of application No. PCT/JP2010/060650, filed on Jun. 23, 2010.

(51) Int. Cl.
G06F 12/00 (2006.01)
G06F 12/08 (2006.01)

(52) U.S. Cl.
CPC ...... *G06F 12/0835* (2013.01); *G06F 2212/502* (2013.01); *G06F 12/0811* (2013.01); *G06F 2212/6012* (2013.01); *G06F 2212/1028* (2013.01); *G06F 12/0806* (2013.01)
USPC ................... 711/118; 711/E12.069; 711/150; 711/168

(58) Field of Classification Search
USPC .......................................... 711/118, 168, 150
See application file for complete search history.

(56) References Cited

U.S. PATENT DOCUMENTS

2005/0264316 A1   12/2005 Atkinson
2008/0005607 A1   1/2008 Fukatsu

FOREIGN PATENT DOCUMENTS

| JP | 11-134077 | 5/1999 |
|---|---|---|
| JP | 2002-108702 | 4/2002 |
| JP | 2008-9647 | 1/2008 |
| JP | 2008-501197 | 1/2008 |
| JP | 2009-211540 | 9/2009 |

OTHER PUBLICATIONS

International Search Report of PCT/JP2010/060650 mailed Sep. 28, 2010.
Japanese Office Action mailed Feb. 18, 2014 in corresponding Japanese Application No. 2012-521215.
Japanese International Preliminary Report on Patentability mailed Jan. 24, 2013, issued in corresponding PCT Patent Application No. PCT/JP2010/060650.

*Primary Examiner* — Reginald Bragdon
*Assistant Examiner* — Hamdy S Ahmed
(74) *Attorney, Agent, or Firm* — Staas & Halsey LLP

(57) ABSTRACT

A multi-core system includes processor cores having caches; an external input/output bus connected to the processor cores; memory accessed by the processor cores via the external input/output bus; profile information indicating the volume of a write access to the memory by tasks concurrently allocated to the processor cores and whether a cache miss will occur in a read access to the caches; and an operating system that controls clock frequency of the external input/output bus to be a first frequency, based on the volume of the write access to the memory by the tasks and the bus width of the external input/output bus when a cache miss in read access is judged to not occur in executing the tasks and that controls the clock frequency of the external input/output bus to be a second frequency higher than the first frequency when a cache miss in read access is judged.

9 Claims, 6 Drawing Sheets

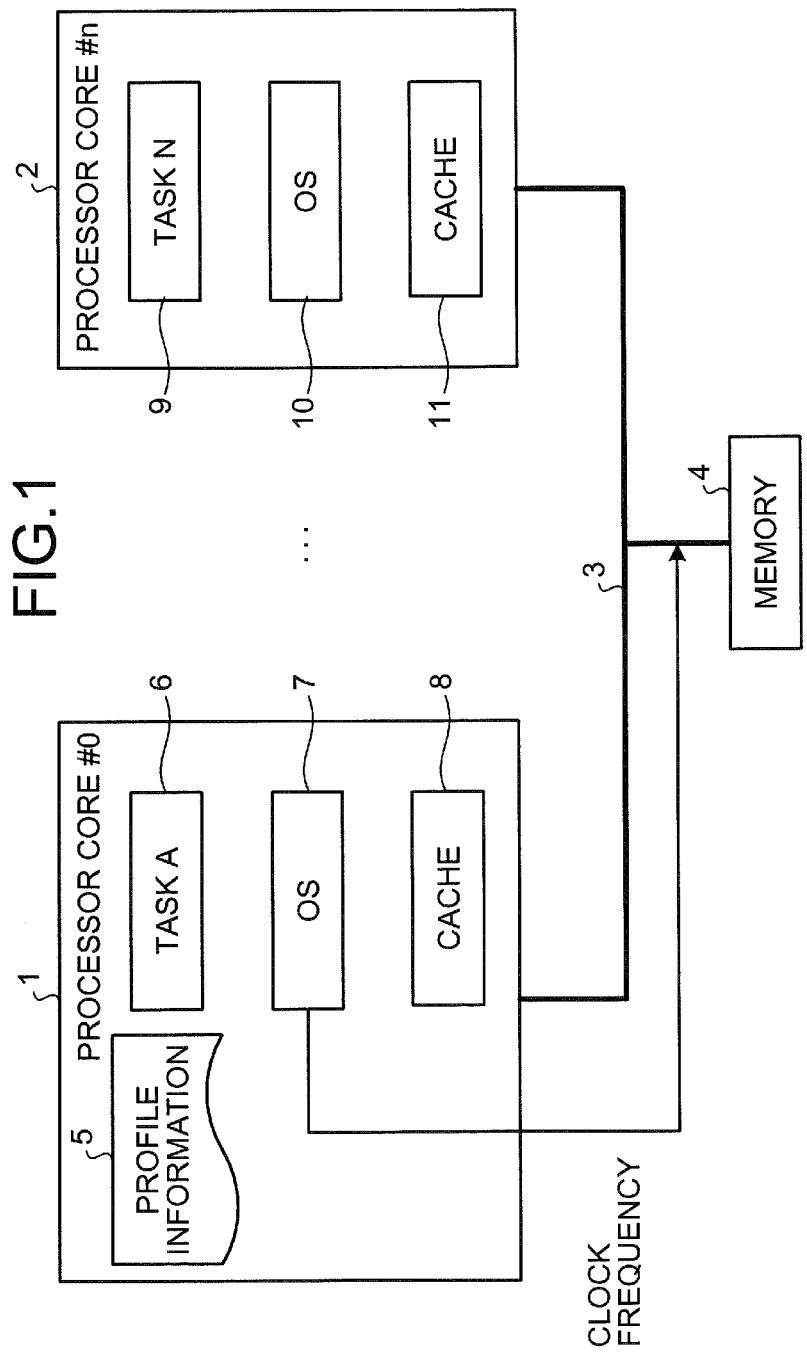

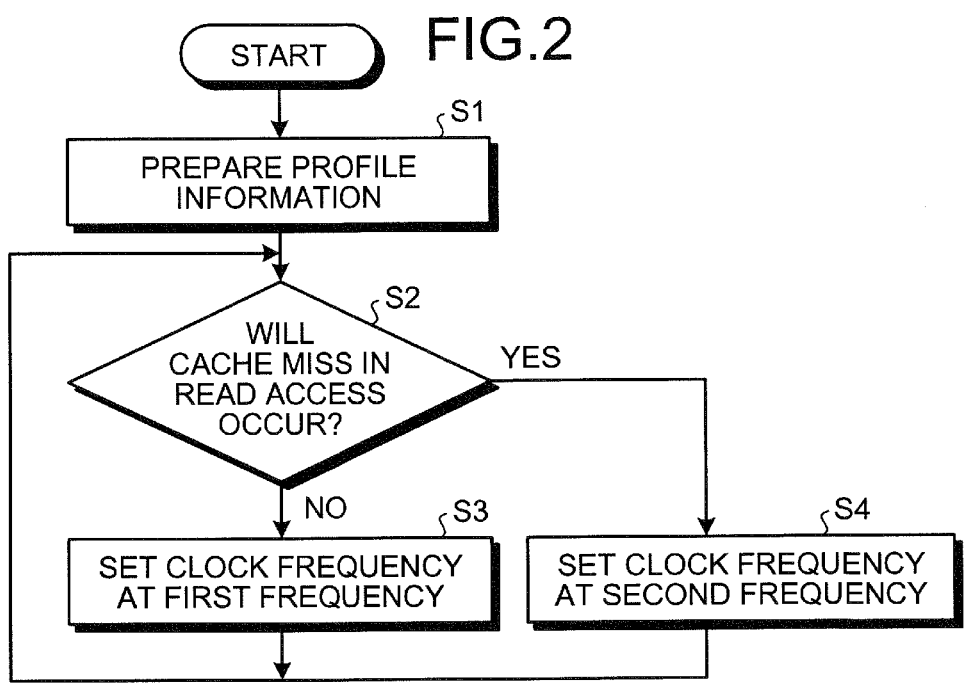

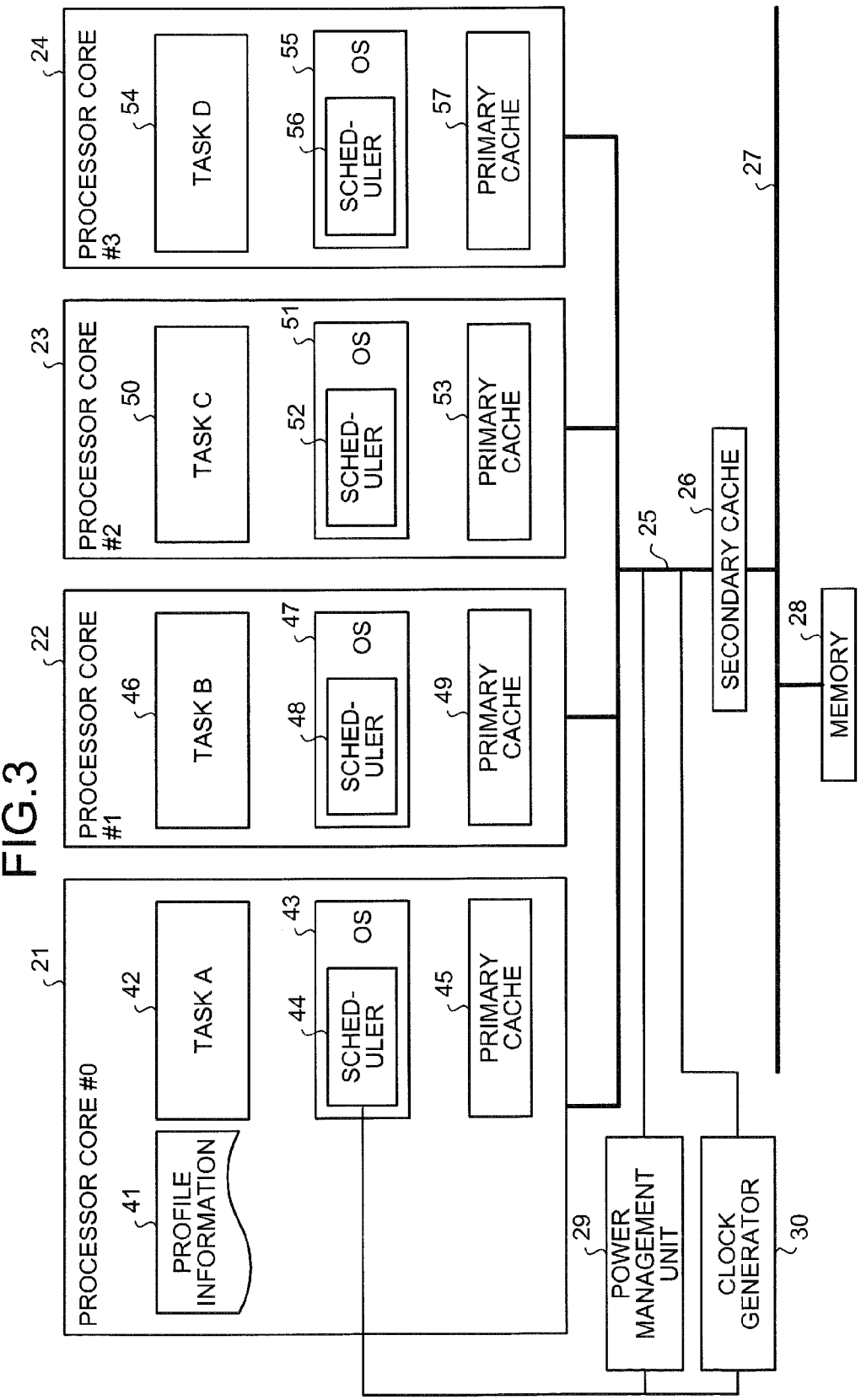

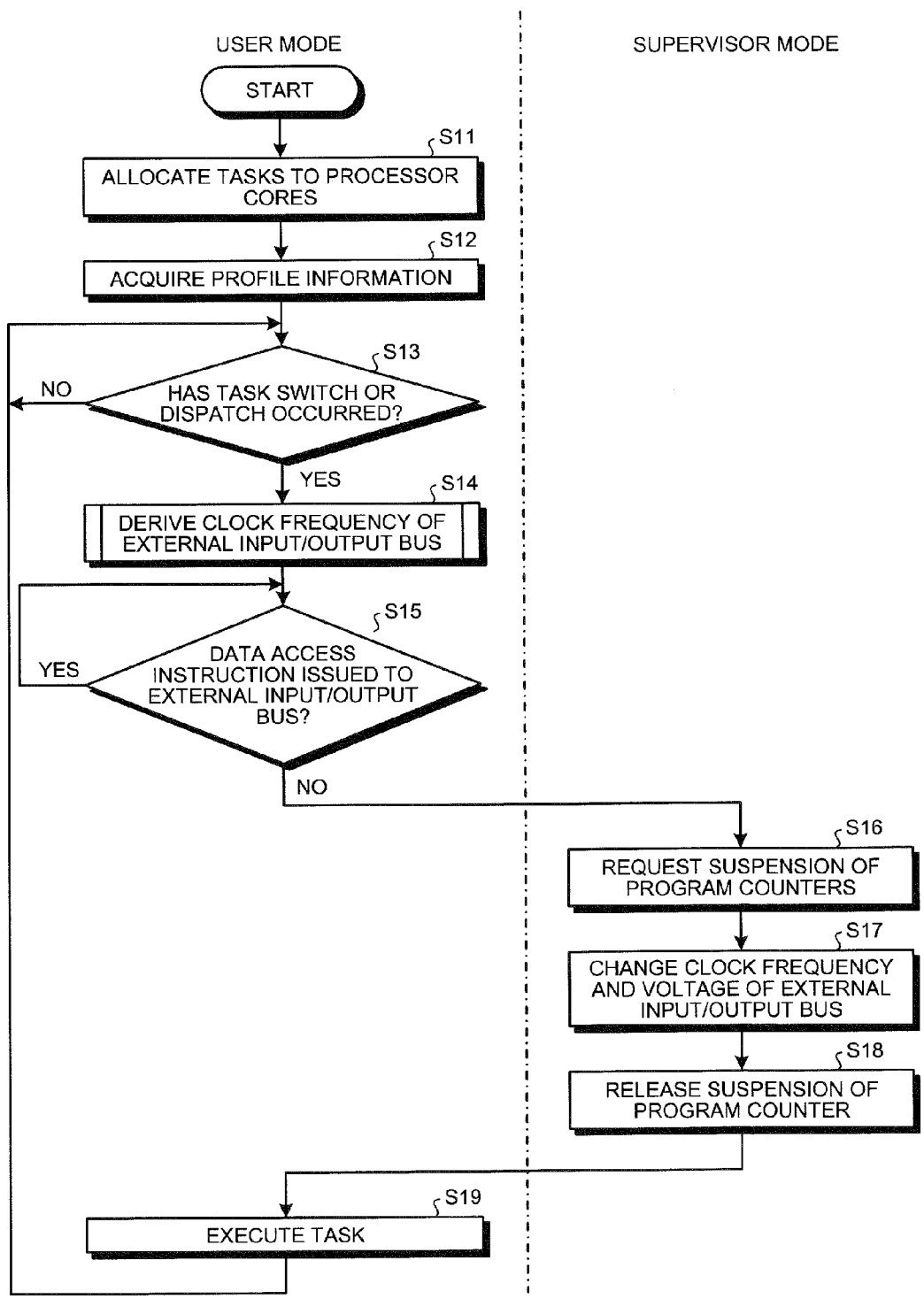

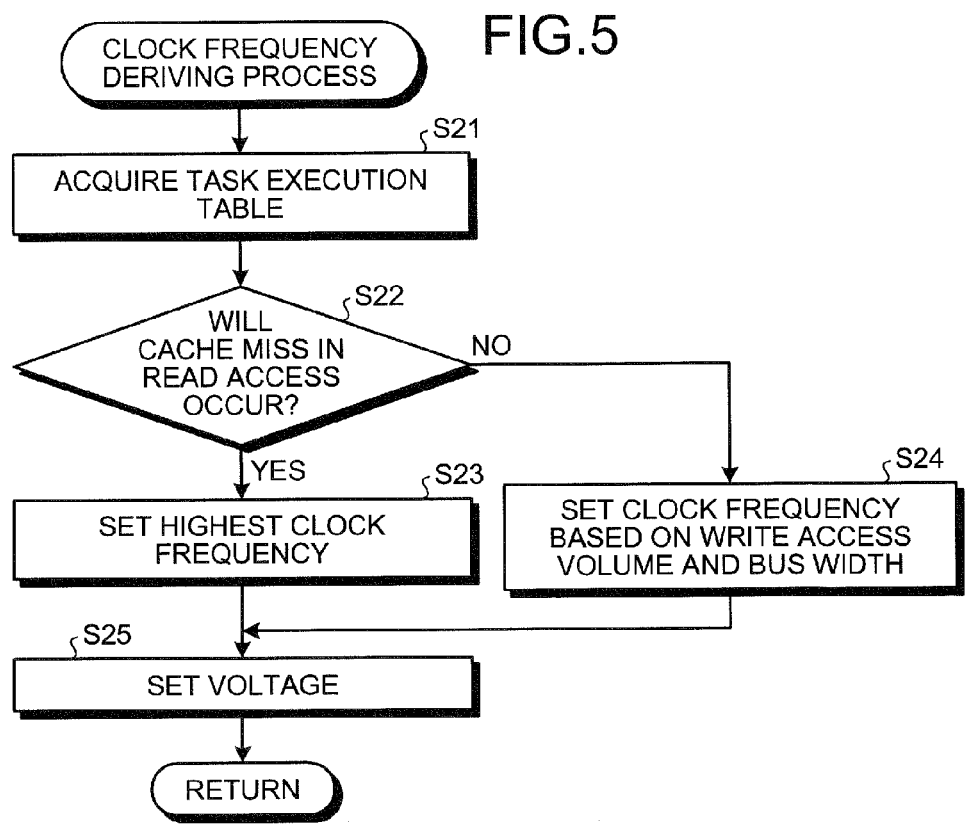

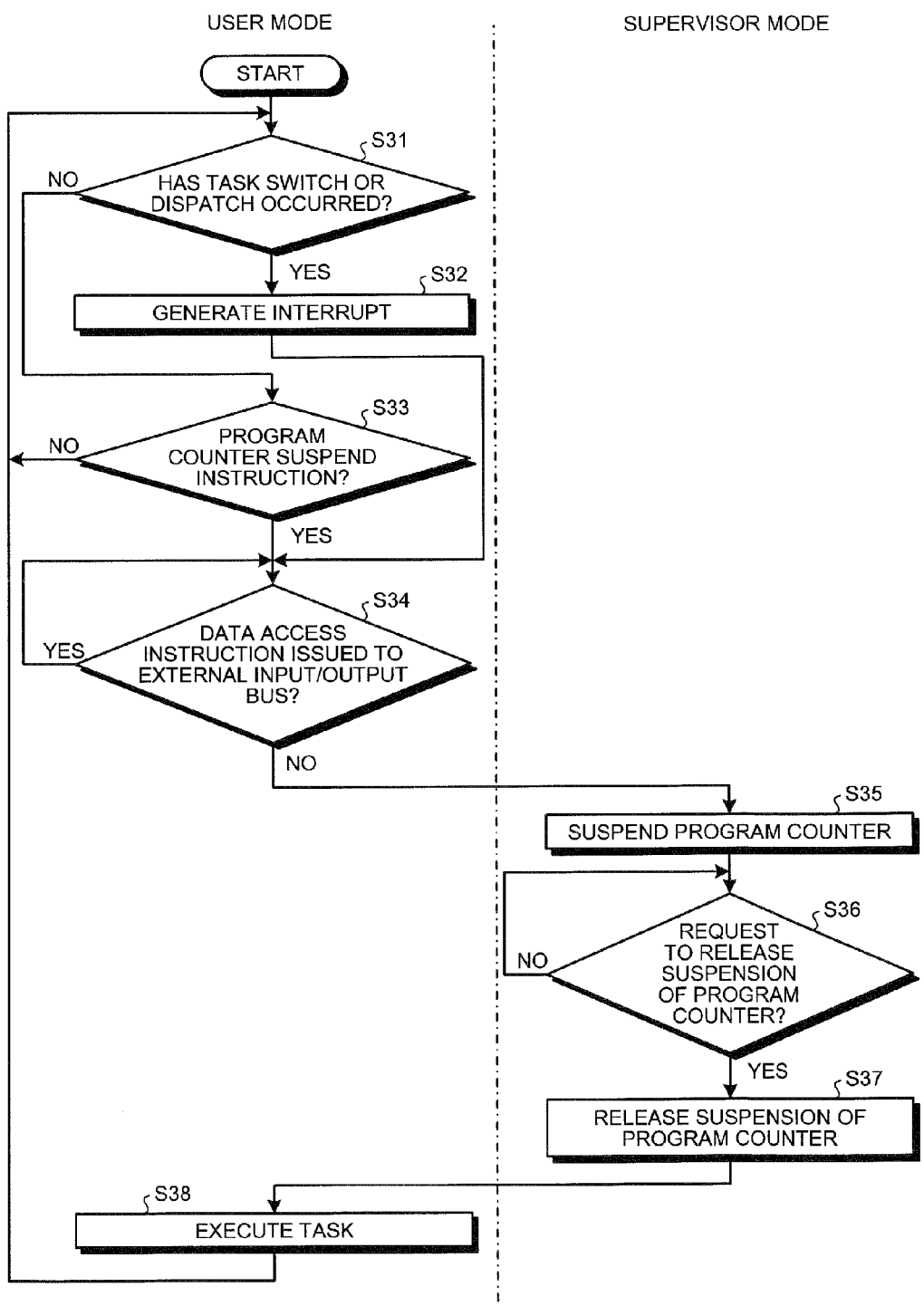

MULTI-CORE SYSTEM AND EXTERNAL INPUT/OUTPUT BUS CONTROL METHOD

CROSS REFERENCE TO RELATED APPLICATIONS

This application is a continuation application of International Application PCT/JP2010/060650, filed on Jun. 23, 2010 and designating the U.S., the entire contents of which are incorporated herein by reference.

FIELD

The embodiments discussed here are related to a multi-core system and an external input/output bus control method.

BACKGROUND

One conventional single-core system includes a device that predicts a cache hit rate and controls the clock frequency of a CPU based on the predicted hit rate. The single-core system further includes technology that adds into a program, an instruction to designate a clock frequency according to the predicted hit rate. Further, a single-core system may includes a device that refers to cache hit information, supplies a clock signal to a bus controller and an external interface circuit when these circuits operate and suspends the supply of the clock signal to these circuits in the case of the cache hit. With respect write-back processing of writing data from the cache to an external memory, a technology exists that executes the write-back processing during a period in which a task under the control of an operating system is not being executed. Further, a technology exists that monitors bus traffic and the temperature of a bus device, and accordingly set the bus clock.

For examples of such technologies, refer to Japanese Laid-Open Patent Publication Nos. 2004-260274, 2008-250572, 2008-305201, and 2001-325007; and Published Japanese-Translation of PCT Application, Publication No. 2008/001671.

Conventionally, in a case of performing parallel processing in a multi-core system in which plural processor cores access common memory (shared memory) by way of an external input/output (I/O) bus, however, there has been the following problem. When the tasks are executed at each processor core, the operating system does not know whether a cache miss will occur. Therefore, the clock frequency of the external input/output bus is fixed at the highest frequency so that if a cache miss in read access occurs, the data can be read out quickly from the shared memory. Namely, even when access of the shared memory is infrequent and when high speed access of the shared memory is not necessary, the external input/output bus is operated at high speed. Therefore, there has been a problem of wasteful power consumption.

SUMMARY

According to an aspect of an embodiment, a multi-core system includes plural processor cores having caches; an external input/output bus connected to each of the processor cores; memory accessed by each of the processor cores by way of the external input/output bus; profile information including information concerning the volume of a write access to the memory by each task to be allocated to the processor cores and information as to whether a cache miss will occur in a read access to the caches; and an operating system that controls a clock frequency of the external input/output bus so as to be set at a first frequency, based on the volume of the write access to the memory by each of the tasks to be concurrently allocated to the processor cores and the bus width of the external input/output bus when a cache miss in read access is judged to not occur in execution of the tasks, based on the profile information and that controls the clock frequency of the external input/output bus so as to be set at a second frequency higher than the first frequency when a cache miss in read access is judged to occur in the execution of the tasks to be concurrently allocated to the processor cores.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram of a multi-core system according to a first embodiment;

FIG. 2 is a flowchart of an external input/output bus control method according to the first embodiment;

FIG. 3 is a block diagram of the multi-core system according to a second embodiment;

FIG. 4 is a flowchart of an operation procedure of a master OS in an external input/output bus control method according to the second embodiment;

FIG. 5 is a flowchart of a clock frequency derivation procedure in the external input/output bus control method according to the second embodiment; and FIG. 6 is a flowchart of an operation procedure of a slave OS in the external input/output bus control method according to the second embodiment.

DESCRIPTION OF EMBODIMENTS

Embodiments of a multi-core system and an external input/output bus control method according to the present invention will be described in detail with reference to the accompanying drawings. The following embodiments cause, in the multi-core system, the external input/output bus to operate at the highest speed when a cache miss in read access occurs in a task being executed and cause the external input/output bus to operate at a clock frequency determined by a write access volume of each task and a bus width when the cache miss in read access does not occur. Here, one meaningful unit (unit of processing) in the processing to be performed by a processor core is referred to as a task. Therefore, a task includes the concepts of thread, process, etc. The present invention is not to be limited to these embodiments.

FIG. 1 is a block diagram of the multi-core system according to a first embodiment. As depicted in FIG. 1, the multi-core system has a processor core #0_1 as a master and more than one processor core #n_2 as a slave. Processor cores 1 and 2 have caches 8 and 11, respectively. An external input/output bus 3 is connected to the processor cores 1 and 2. Memory 4 is connected to the external input/output bus 3. Each of the processor cores 1 and 2 accesses the memory 4 by way of the external input/output bus 3. While FIG. 1 depicts one processor core as a slave, the number of the processor cores provided as slaves may be two or more.

In the processor core #0_1, an operating system (OS) 7 is in operation and on the operating system 7, a task A 6 is executed. Likewise, in the processor core #n_2, an operating system (OS) 10 is in operation and on the operating system 10, a task N 9 is executed. Since the tasks 6 and 9 to be concurrently executed on the processor cores 1 and 2 have no interdependence, the tasks 6 and 9 do not utilizes the output of the other. Namely, the multi-core system performs distributed processing.

The processor core #0_1 as the master has profile information 5. The profile information 5 includes information concerning the write access volume of each of the tasks 6 and 9 to be allocated to the processor cores 1 and 2, respectively. The profile information 5 includes information as to whether a cache miss will occur in a read access of the caches 8 and 11 in the processor cores 1 and 2, respectively.

The operating system 7 of the processor core #0_1 as the master judges whether a cache miss in read access will occur in the execution of the tasks 6 and 9 to be concurrently allocated to the processor cores 1 and 2, respectively, based on the profile information 5. Upon judging that a cache miss in read access will not occur, the operating system 7 of the processor core #0_1 as the master controls the clock frequency of the external input/output bus 3 so as to be set at a first frequency. The first frequency is a frequency that is determined based on the write access volume of each of the tasks 6 and 9 to be concurrently allocated to the processor cores 1 and 2, respectively, and the bus width of the external input/output bus 3. Upon judging that a cache miss in read access will occur, the operating system 7 of the processor core #0_1 as the master controls the clock frequency of the external input/output bus 3 so as to be set at a second frequency. The second frequency is higher than the first frequency.

FIG. 2 is a flowchart of the external input/output bus control method according to the first embodiment. As depicted in FIG. 2, before controlling the clock frequency of the external input/output bus, the profile information 5 is prepared (step S1). The operating system 7 of the processor core #0_1 as the master judges, based on the profile information 5, if a cache miss in read access will occur in the tasks 6 and 9 being executed in the processors 1 and 2, respectively (step S2).

Upon judging that a cache miss in read access will not occur (step S2: NO), the operating system 7 of the processor core #0_1 as the master sets the clock frequency of the external input/output bus 3 at the first frequency (step S3). Upon judging that a cache miss in read access will occur (step S2: YES), the operating system 7 of the processor core #0_1 as the master sets the clock frequency of the external input/output bus 3 at the second frequency (step S4). If a task switch or a task dispatch occurs at either one of the processor cores 1 and 2 and a change is caused to the tasks that are to be executed concurrently in the multi-core system, steps S2 to S4 are repeated.

According to the first embodiment, if it is judged that the cache miss will not occur in the read access, the clock frequency of the external input/output bus 3 is controlled to be set at the first frequency of a low speed. Since the power required for driving the external input/output bus 3 is proportional to about the square of the clock frequency, a clock frequency of a lower speed enables reductions in power consumption. Under such control, based on the write access volume of each of the tasks 6 and 9 and the bus width of the external input/output bus 3, the clock frequency is set at the first frequency that enables each of the tasks 6 and 9 to finish the write access to the memory 4 before the task finish, whereby each of the tasks 6 and 9 can finish the write access to the memory 4 before the task finish. On the other hand, if it is judged that the cache miss in read access will occur, the clock frequency of the external input/output bus 3 is controlled to be set at the second frequency of a high speed and therefore, data can be read out from the memory 4 at the high speed. Namely, since the time (stall time) during which the processing in the multi-core system is suspended due to the cache miss in read access can be prevented from being lengthened, drops in the performance of the multi-core system can be prevented.

In the case of simply diverting the technology for the single-core system for use in the multi-core system, since it is necessary for each processor to detect cache hits and misses, design becomes complicated. By contrast, according to the first embodiment, since it is judged whether a cache miss in read access will occur, based on the profile information 5, the processor cores are not respectively required to detect cache hits and misses.

FIG. 3 is a block diagram of the multi-core system according to a second embodiment. As depicted in FIG. 3, the multi-core system has a processor core #0_21 as the master and, not necessarily limited hereto, for example, three processor cores (#1, #2, and #3) 22 to 24 as slaves. The processor cores 21 to 24 have primary caches 45, 49, 53, and 57, respectively. An external input/output bus 25 is connected to the processor cores 21 to 24. A secondary cache 26 is connected to the external input/output bus 25. The secondary cache 26 and a memory 28 are connected to a system bus 27. A data read-out speed becomes slower in the order of the primary caches 45, 49, 53, and 57, the secondary cache 26, and the memory 28.

In the processor cores 21 to 24, operating systems (OSs) 43, 47, 51, and 55 are in operation, respectively. On the operating systems 43, 47, 51, and 55, tasks (A, B, C, and D) 42, 46, 50, and 54 are executed, respectively, and have no data interdependence. The operating systems 43, 47, 51, and 55 have schedulers 44, 48, 52, and 56, respectively. Each of the schedulers 44, 48, 52, and 56 performs scheduling of tasks. The scheduler 44 of the processor core #0_21 as the master allocates the tasks to the processor cores (#0 to #3) 21 to 24.

The scheduler 44 of the processor core #0_21 as the master works with the schedulers 48, 52, and 56 of other processor cores (#1, #2, and #3) 22 to 24. By this, all schedulers 44, 48, 52, and 56 know the volume of the tasks allocated to the processor cores 21 to 24.

The processor core #0_21 as the master has profile information 41. The profile information 41 includes the information concerning the write access volume per unit time, for all tasks to be allocated to the processor cores 21 to 24. The profile information 41 includes information as to whether a cache miss will occur at the time of a read access with respect to all tasks to be allocated to the processor cores 21 to 24. The profile information 41 is preliminarily acquired by a profiler or a simulator at the design stage of, for example, an application program. The profile information 41 is described in, for example, the application program and is stored in a memory (not depicted) incorporated in the processor core #0_21 as the master.

The operating system 43 operating in the processor core #0_21 as the master controls the clock frequency and drive voltage of the external input/output bus 25, based on the profile information 41. A power management unit 29 as a voltage controller and a clock generator 30 are disposed in the multi-core system. The clock generator 30, under control of the operating system 43 operating in the processor core #0_21 as the master, sets the clock frequency of the external input/output bus 25. The power management unit 29, under control of the operating system 43 operating in the processor core #0_21 as the master, sets the drive voltage of the external input/output bus 25. The drive voltage of the external input/output bus 25 is set at a voltage required to cause the external input/output bus 25 to operate at the set clock frequency.

Description will be made of two procedures, a procedure in the operating system 43 operating in the processor core #0_21 as the master and a procedure in the operating systems 47, 51, and 55 operating in the processor cores (#1, #2, and #3) 22 to 24 as slaves, separately. The procedure in the operating system 43 operating in the processor core #0_21 as the master will firstly be described.

FIG. 4 is a flowchart of an operation procedure of the master OS in the external input/output bus control method according to the second embodiment. As depicted in FIG. 4, upon the start of the processing in the multi-core system, the processor core #0_21 as the master operates in a user mode. In the user mode, the scheduler 44 of the operating system 43 of the processor core #0_21 as the master allocates tasks to the processor cores (#0 to #3) 21 to 24 (step S11). The processor core #0_21 as the master acquires the profile information 41 (step S12).

The operating system 43 of the processor core #0_21 as the master judges if a task switch or dispatch has occurred at any processor core (step S13). For example, the operating system 43 of the processor core #0_21 as the master can know the occurrence of the task switch or dispatch by an interrupt from the processor core in which the task switch or dispatch has occurred. If no task switch or dispatch has occurred at a processor core (step S13: NO), the operating system 43 of the processor core #0_21 as the master waits for the occurrence of a task switch or dispatch.

When a task switch or dispatch has occurred at a processor core (step S13: YES), the operating system 43 of the processor core #0_21 as the master derives the clock frequency of the external input/output bus 25, based on the profile information of the tasks (A, B, C, and D) 42, 46, 50, and 54 to be executed in the processor cores (#0 to #3) 21 to 24, respectively (step S14). Details of derivation processing at step S14 will be described later.

The operating system 43 of the processor core #0_21 as the master judges if, for example, a data access instruction has been issued to access the external input/output bus 25 (step S15). If, for example, a data access instruction has been issued (step S15: YES), the operating system 43 of the processor core #0_21 as the master waits for a state in which, for example, the data access instruction to access the external input/output bus 25 is completed or terminated.

If, for example, a data access instruction has not been issued or if, for example, an issued data access instruction has been completed or terminated (step S15: NO), the processor core #0_21 as the master moves to a supervisor mode. In the supervisor mode, the operating system 43 of the processor core #0_21 as the master generates an interrupt, requesting all processor cores (#0 to #3) 21 to 24 to suspend program counters (step S16).

Upon suspension of the program counters of all processor cores (#0 to #3) 21 to 24, the operating system 43 of the processor core #0_21 as the master changes the clock frequency and the drive voltage of the external input/output bus 25 (step S17). For example, the operating system 43 of the processor core #0_21 as the master outputs a control signal to the clock generator 30 and the power management unit 29, based on the clock frequency and the voltage derived at step S14. The clock generator 30 and the power management unit 29 set the clock frequency and the drive voltage of the external input/output bus 25, based on the control signal.

The operating system 43 of the processor core #0_21 as the master requests all processor cores (#0 to #3) 21 to 24 to release the suspension of the program counters. The operating system 43 of the processor core #0_21 as the master releases the suspension of the program counter of the processor core #0_21 (step S18). The processor core #0_21 transitions to the user mode. Upon returning to the user mode, the operating system 43 of the processor core #0_21 executes the task allocated to the processor core #0_21 as the master (step S19) and returns to step S13. Thereafter, steps S13 to S19 are repeated.

FIG. 5 is a flowchart of a clock frequency derivation procedure in the external input/output bus control method according to the second embodiment. As depicted in FIG. 5, in the clock frequency derivation processing, the operating system 43 of the processor core #0_21 as the master firstly acquires a task execution table (step S21). Since identifiers of all tasks being executed in the processor cores (#0 to #3) 21 to 24 are registered in the task execution table, the operating system 43 can recognize all tasks being executed. The task execution table may be disposed, for example, in an arbitrary memory of the multi-core system.

The operating system 43 of the processor core #0_21 as the master judges, based on the profile information 41 of the tasks being executed, if a group of the tasks being executed includes any task that will cause a cache miss in read access, namely, whether a cache miss will occur (step S22). If a task that will cause a cache miss in read access is included (step S22: YES), the operating system 43 of the processor core #0_21 as the master sets, as the clock frequency of the external input/output bus 25, the highest frequency among the clock frequencies settable for the external input/output bus 25 (step S23). For example, when the clock frequencies settable for the external input/output bus 25 are 50 Hz, 100 Hz, 150 Hz, 200 Hz, 250 Hz, and 300 Hz, the operating system 43 of the processor core #0_21 as the master sets the clock frequency of the external input/output bus 25 at 300 Hz.

On the other hand, if a task that will cause a cache miss in read access is not included (step S22: NO), the operating system 43 of the processor core #0_21 as the master obtains frequency x (unit: Hz) expressed by equation (1). In equation (1), Ai is the volume per unit time (unit: bit/sec) of the write access to the memory 28 in task i. Therefore, $\Sigma Ai$ is a sum of the write access volumes per unit time of all tasks being executed. B is the bus width (unit: bit) of the external input/output bus 25.

$$x = \Sigma Ai/B \quad (1)$$

Frequency x to be obtained by equation (1) is the lower limit of the clock frequency of the external input/output bus 25. The lower limit of the clock frequency of the external input/output bus 25 is a frequency at which the sum ($\Sigma Ai$) of the write access volumes per unit time of all tasks being executed is equal to the data transfer volume per unit time (x×B) of the external input/output bus 25. If the clock frequency of the external input/output bus 25 is greater than or equal to x, all tasks being executed can finish all write accesses to the memory 28 within the execution time of the tasks. Generally, the clock frequency settable for the external input/output bus 25 is set in stages. If $\alpha$ and $\beta$ ($\alpha<\beta$, unit: Hz for each) are taken as the clock frequency settable for the external input/output bus 25 and if $\alpha$ and $\beta$ satisfy equation (2) relative to x obtained by equation (1), the operating system 43 of the processor core #0_21 as the master sets $\beta$ as the clock frequency of the external input/output bus 25 (step S24).

$$\alpha \leq x \leq \beta \quad (2)$$

Suppose, for example, that in the processor core #0_21, the processor core #1_22, the processor core #2_23, and the processor core #3_24, the task A 42, the task B 46, the task C 50, and the task D 54, respectively, are dispatched. Suppose that the write access volume per unit time of the task A 42, the task B 46, the task C 50, and the task D 54 is 200, 400, 700, and 500, respectively. Suppose that bus width B of the external input/output bus 25 is 20. In this case, from equation (1), the lower limit x of the clock frequency of the external input/output bus 25 comes to 90(=(200+400+700+500)/20). For example, when the clock frequencies settable for the external input/output bus 25 are 50 Hz, 100 Hz, 150 Hz, 200 Hz, 250 Hz, and 300 Hz, the operating system 43 of the processor core #0_21 as the master sets the clock frequency of the external input/output bus 25 at 100 Hz, based on equation (2).

The operating system 43 of the processor core #0_21 as the master sets the voltage according to the clock frequency obtained at step S23 or step S24 as the drive voltage of the external input/output bus 25 (step S25). For example, configuration may be such that a characterization curve that indicates a relationship of the clock frequency and the drive voltage is preliminarily arranged and configuration may be such that the voltage will be set according to the clock frequency of the external input/output bus 25 based on this characterization curve. Thus, the flow returns to step S15 of the flowchart depicted in FIG. 4. The procedure in the operating systems 47, 51, and 55 operating in the processor cores (#1, #2, and #3) 22 to 24 as the slave, respectively, will be described.

FIG. 6 is a flowchart of an operation procedure of a slave OS in the external input/output bus control method according to the second embodiment. As depicted in FIG. 6, upon start of the processing in the multi-core system, the processor cores (#1 to #3) 22 to 24 as the slave operate in the user mode. While the procedure in the processor core #1_22 as the slave will be described, the case is the same with the processor core #2_23 and the processor core #3_24 as the slave.

In the user mode, the operating system 47 of the processor core #1_22 as the slave judges if a task switch or dispatch has occurred (step S31). If a task switch or dispatch has occurred (step S31: YES), the operating system 47 of the processor core #1_22 as the slave generates an interrupt to the processor core #0_21 as the master, giving notification of the switched task (step S32). The flow goes to step S34. If a task switch or dispatch has not occurred (step S31: NO), the operating system 47 of the processor core #1_22 as the slave judges if there is the program counter suspend instruction by the interrupt from the processor core #0_21 as the master (step S33).

If there is no program counter suspend instruction (step S33: NO), the flow returns to step S31 and the operating system 47 of the processor core #1_22 as the slave waits for a task switch or dispatch to occur. If there is a program counter suspend instruction (step S33: YES), the flow goes to step S34. At step S34, the operating system 47 of the processor core #1_22 as the slave judges if, for example, a data access instruction has been issued for the external input/output bus 25 (S34). If, for example, a data access instruction has been issued (step S34: YES), the operating system 47 of the processor core #1_22 as the slave waits for the data access instruction to be, for example, completed or terminated.

If, for example, a data access instruction has not been issued or if an issued data access instruction, for example, has been completed or terminated (step S34: NO), the processor core #1_22 as the slave transitions to the supervisor mode. In the supervisor mode, the operating system 47 of the processor core #1_22 as the slave suspends the program counter of the processor core #1_22 and notifies the processor core #0_21 of the suspension (step S35).

The operating system 47 of the processor core #1_22 as the slave then judges if there is a request to release the suspension of the program counter from the processor core #0_21 (step S36). If there is no request to release the suspension of the program counter (step S36: NO), the operating system 47 of the processor core #1_22 as the slave waits to receive a request to release the suspension of the program counter. If there is a request to release the suspension of the program counter (step S36: YES), the operating system 47 of the processor core #1_22 as the slave releases the suspension of the program counter of the processor core #1_22 (step S37).

The processor core #1_22 as the slave transitions to the user mode. Upon returning to the user mode, the operating system 47 of the processor core #1_22 as the slave executes the task allocated to the processor core #1_22 (step S38) and returns to step S31. Thereafter, the steps S31 to S38 are repeated.

According to the second embodiment, the same effect can be obtained as that of the first embodiment. While the first embodiment and the second embodiment have been described giving an example of the multi-core processor having plural processor cores incorporated in one microprocessor as the multi-core system, these embodiments can be applied in the same manner to a multiprocessor having plural microprocessors. In the application to the multiprocessor, the processor core becomes the processor in the above description. The multi-core system and the external input/output bus control method according to the first embodiment or the second embodiment can be applied, for example, to a device having a built-in system on a multi-core base, for example, a cellular phone, etc.

The multi-core system and the external input/output bus control method effect lower power consumption.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multi-core system comprising:
    a plurality of processor cores having caches;
    an external input/output bus connected to each of the processor cores;
    a memory accessed by each of the processor cores by way of the external input/output bus;
    profile information including information concerning the volume of a write access to the memory by each task to be allocated to the processor cores and information as to whether a cache miss will occur in a read access to the caches; and
    an operating system that controls a clock frequency of the external input/output bus so as to be set at a first frequency, based on the volume of the write access to the memory by each of the tasks to be concurrently allocated to the processor cores and the bus width of the external input/output bus when a cache miss in read access is judged to not occur in execution of the tasks, based on the profile information and that controls the clock frequency of the external input/output bus so as to be set at a second frequency higher than the first frequency when a cache miss in read access is judged to occur in the execution of the tasks to be concurrently allocated to the processor cores.

2. The multi-core system according to claim 1, wherein
the first frequency is a frequency among the clock frequencies settable for the external input/output bus and is greater than or equal to a value obtained by dividing a total value of the volumes per unit time of the write access to the memory by the tasks concurrently allocated to the processor cores by the bus width of the external input/output bus.

3. The multi-core system according to claim 2, comprising:
a voltage controller that controls a drive voltage of the external input/output bus so as to be set at a voltage necessary for the external input/output bus to operate at the clock frequency set by the operating system.

4. The multi-core system according to claim 1, wherein
the second frequency is the highest frequency among the clock frequencies settable for the external input/output bus.

5. The multi-core system according to claim 4, comprising:
a voltage controller that controls a drive voltage of the external input/output bus so as to be set at a voltage necessary for the external input/output bus to operate at the clock frequency set by the operating system.

6. A method of controlling an external input/output bus of a multi-core system having memory that by way of the external input/output bus, is accessed by a plurality of processor cores having caches, the method comprising:

preparing, as profile information, information concerning the volume of a write access to the memory by each of task to be allocated to the processor cores and information as to whether a cache miss will occur in a read access to the caches;

judging if a cache miss will occur in the tasks being executed in the processor cores, based on the information as to whether a cache miss will occur in the read access to the caches;

setting a clock frequency of the external input/output bus at a first frequency, based on the volume of the write access to the memory by each of the tasks and the bus width of the external input/output bus if a cache miss in read access is judged to not occur in the tasks being executed; and setting the clock frequency of the external input/output bus at a second frequency higher than the first frequency if a cache miss in read access is judged to occur in the tasks being executed.

7. The control method according to claim 6, wherein
the first frequency is a frequency among the clock frequencies settable for the external input/output bus and is greater than or equal to a value obtained by dividing a total value of the volumes per unit time of the write access to the memory by the tasks concurrently allocated to the processor cores by the bus width of the external input/output bus.

8. The external input/output bus control method according to claim 6, wherein
the second frequency is the highest frequency among the clock frequencies settable for the external input/output bus.

9. The external input/output bus control method according to claim 6, further comprising:
controlling a drive voltage of the external input/output bus so as to be set at a voltage necessary for the external input/output bus to operate at the clock frequency set.

* * * * *